W. T. GRIMMER.
PLOW.
APPLICATION FILED MAR. 19, 1909.
945,937.
Patented Jan. 11, 1910.
2 SHEETS—SHEET 1.
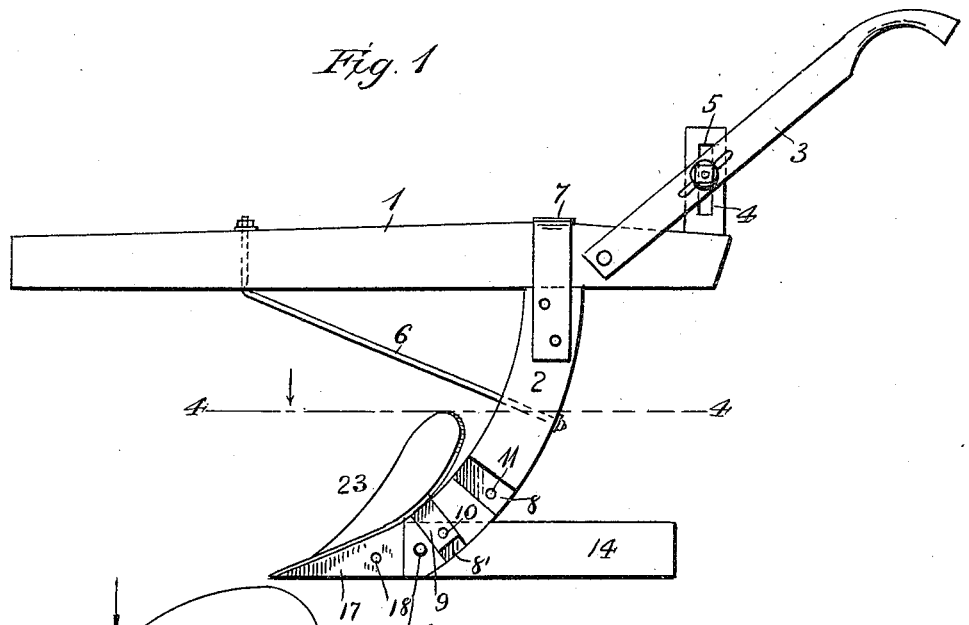
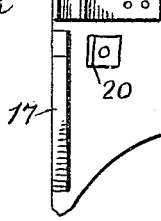
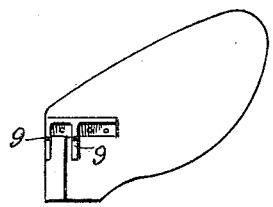
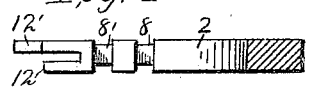
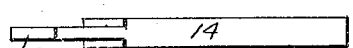
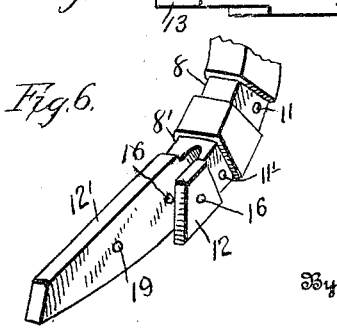
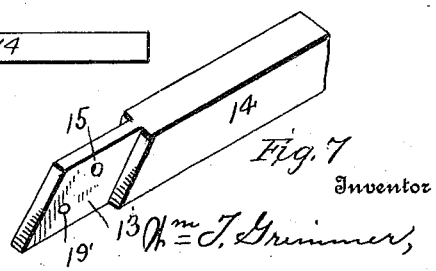
Witnesses
F. L. Durand
R. P. Duffie
Inventor
Wm. T. Grimmer,
By John S. Duffie
Attorney W. T. GRIMMER.
PLOW.
APPLICATION FILED MAR 19, 1909.
945,937.
Patented Jan. 11, 1910.
2 SHEETS—SHEET 2.
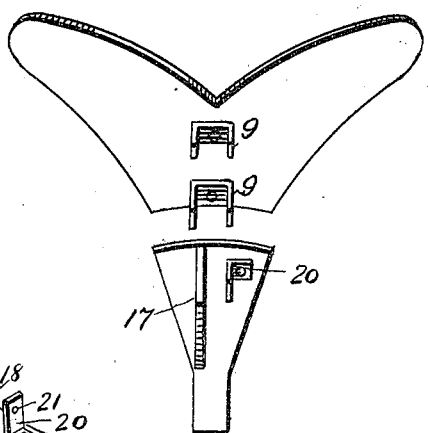
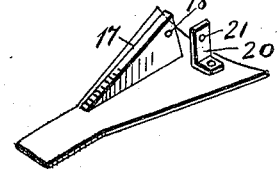
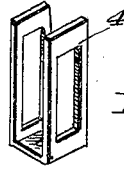
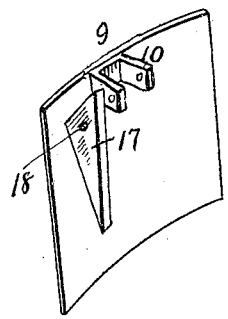
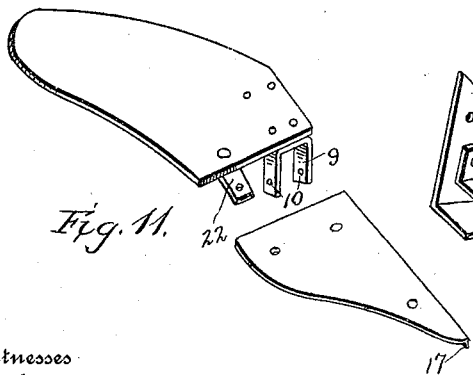
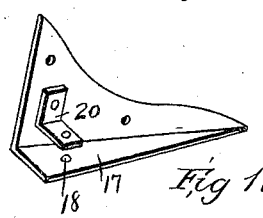

UNITED STATES PATENT OFFICE.

WILLIAM T. GRIMMER, OF VINEYARD, ARKANSAS.

PLOW.

945,937.  Specification of Letters Patent.  Patented Jan. 11, 1910.

Application filed March 19, 1909. Serial No. 484,411.

*To all whom it may concern:*

Be it known that I, WILLIAM T. GRIMMER, a citizen of the United States, residing at Vineyard, in the county of Lee and State of Arkansas, have invented certain new and useful Improvements in Plows, of which the following is a specification.

My invention relates to new and useful improvements in farming implements and particularly to that class of cultivators known as plows.

My object is to produce a device of the nature above specified, adapted to be used in the capacity of a great variety of implements of its class, by the simple process of substituting one plow point for another.

With these and other objects in view, my invention consists of the novel construction and arrangement of parts described in this specification, illustrated in the accompanying drawings, forming a part thereof, and particularly pointed out in the claims hereunto attached.

Referring to the drawings:—Figure 1 is a side elevation of my invention. Fig. 2 is a bottom plan view of the plow point shown in connection with my device, illustrated in Fig. 1, indicated by the numeral 23. Fig. 3 is a rear elevational view of the same. Fig. 4 is a longitudinal sectional view of Fig. 1, taken on the line 4—4, looking in the direction of the arrow. Fig. 5 is a top plan view of the landside indicated in Fig. 1, by the numeral 14. Fig. 6 is a perspective view of the lower portion of the plow standard, the landside being removed. Fig. 7 is a perspective view of the landside. Fig. 8 is a bottom plan view of a substitute plow point, being shown in its two sections. Fig. 9 is a bottom perspective view of the lower section of the plow-point shown in Fig. 8. Fig. 10 is a bottom perspective view of another plow-point, adapted to be used in connection with my plow. Fig. 11 is a top perspective view of still another plow-point that may be employed. Fig. 12 is a bottom perspective view of the lower section of the plow-point illustrated in Fig. 11. Fig. 13 is a perspective view of the handle brace shown in Fig. 1.

Referring, now, more particularly to the drawings, my invention is described as follows:—

The beam 1, supported by the standard 2, has the handles 3, adapted to be adjusted by means of the braces 4, having vertically disposed longitudinal holes 5, cut therein. Said beam 1, is substantially reinforced by the rod 6, commonly known as the grass rod; also is held to the standard by suitable fastening means 7.

The lower end of the standard 2, has cut therein recesses 8 and 8$^1$, for the reception of the fastening brackets 9, secured to the under faces of the several plow-points adapted to be used in connection with my plow. These brackets have suitable perforations 10, passing through them, corresponding to perforations 11, or 11$^1$, passing through said standard. The lower end of the standard is bifurcated, forming the two prongs 12 and 12$^1$, said prong 12, being foreshortened for a purpose as will be described later. Fitting snugly in the intervening space between the prongs is the front reduced portion 13, of the landside 14, said reduced portion being provided with a perforation 15, cut therethrough; said perforation 15, corresponds to the perforations 16, passing through said prongs, these perforations registering, thus allowing of suitable fastening means, as a bolt, being passed therethrough. Some of said plow-points have two of the brackets 9, secured to their under faces, while others have only one, it depending upon the relative sizes of the plow-points and the amount of resistance offered them by the soil through which they pass. A tapering perforated fastening-block 17, is secured to the under face of each of said plow-points, or to its lower section. The upper end of this block abuts against the lower end of the foreshortened fork 12, and its inner face rests against the outer face of the front reduced portion of said landside. Thus, in each instance, the block acts as an extension to the prong 12. The perforation in this block is indicated by the numeral 18. A corresponding registering perforation 19 and 19$^1$, respectively, is passed through both the prong 12$^1$, and the front reduced portion of the said landside. Suitable fastening means is adapted to be passed through said perforations.

When thought necessary an additional bracket 20, having a hole 21, is secured to the under faces of each plow-point, the said hole 21, being opposite the perforation 18.

When the plow-point is divided into sections I deem it necessary to secure the two sections together by the aid of a metal fastening-strip 22, riveted to one section near one of its ends and adapted to be removably secured to the other or lower of said sections.

Though I have specifically described my invention, I may exercise the right to make such alterations in the detail and construction as do not sacrifice any of my patentable rights, and as fall within the scope of my claims.

Having described my invention, what I claim as new and desire to secure by Letters Patent, is:—

1. In a device of the kind specified a standard having its lower end bifurcated forming two prongs, a landside adapted to fit between the prongs, said standard having recesses cut therein near the ends of the bifurcated portion, said recesses adapted to receive fastening means secured to a plow point.

2. In a device of the kind specified a standard having its lower end bifurcated, forming two prongs, one of said prongs being foreshortened, a landside, having its front portion reduced, adapted to fit snugly between said prongs, means to hold said landside in place, said standard having recesses cut in its lower end, adapting it to receive a plow point, a plow-point, which is supplied with fastening means registering with and received by said recesses, a fastening-block, secured to said plow-point, said fastening-block fitting into the space left by the fore-shortening of one of said prongs.

3. In a device of the kind specified a standard having its lower end bifurcated, forming two prongs, one of said prongs being foreshortened, a landside, having its front portion reduced, adapted to fit snugly between said prongs, said landside and said prongs having registering perforations, means to hold the landside securely in place, said standard having recesses cut in its lower end, adapting it to receive a plow-point, brackets secured to said plow-point, which brackets are adapted to be received by said recesses, said brackets and recesses provided with registering perforations adapting suitable fastening means to be passed therethrough, a fastening-block, secured to each plow-point, the rear end of which abuts against the foreshortened prong, its inner face resting against the outer face of the reduced portion of said landside, registering perforations passing through the landside, the other of said prongs and said fastening-block, adapting the block to be secured in place.

4. In a plow a standard provided with a plurality of recesses, a plow-point adapted to be secured to the standard at its lower end, the fastening means between said standard and said plow-point consisting of brackets secured to the under side of the point, and a fastening-block also secured to the under face of the point, said brackets adapted to be received by said recesses in said standard, and fastening means between a suitable part of said standard and said fastening-block.

In testimony whereof I affix my signature, in presence of two witnesses.

WILLIAM T. GRIMMER.

Witnesses:
WILLIAM WALTON HARTWIG,
SWAIN DAVISON.